(12) United States Patent
Hall et al.

(10) Patent No.: US 8,135,937 B2
(45) Date of Patent: Mar. 13, 2012

(54) LOGICAL PARTITION MEMORY

(75) Inventors: William E. Hall, Clinton, CT (US); Guerney D. H. Hunt, Yorktown Heights, NY (US); Paul A. Karger, Chappaqua, NY (US); Mark F. Mergen, Mount Kisco, NY (US); David R. Safford, Brewster, NY (US); David C. Toll, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 593 days.

(21) Appl. No.: 12/272,261

(22) Filed: Nov. 17, 2008

(65) Prior Publication Data

US 2010/0125709 A1    May 20, 2010

(51) Int. Cl.
G06F 12/00 (2006.01)
G06F 13/00 (2006.01)
G06F 13/28 (2006.01)
G06F 9/46 (2006.01)
G06F 9/26 (2006.01)
G06F 9/34 (2006.01)

(52) U.S. Cl. ............................ 711/203; 711/6; 718/104
(58) Field of Classification Search .............. 711/6, 200, 711/202–209; 718/104
See application file for complete search history.

(56) References Cited

U.S. PATENT DOCUMENTS

| | | | |
|---|---|---|---|
| 4,253,145 A | 2/1981 | Goldberg | |
| 4,456,954 A | 6/1984 | Bullions, III et al. | |
| 5,109,522 A | 4/1992 | Lent et al. | |
| 5,230,069 A | 7/1993 | Brelsford et al. | |
| 5,555,385 A | 9/1996 | Osisek | |
| 7,089,377 B1 | 8/2006 | Chen | |
| 7,409,487 B1 | 8/2008 | Chen et al. | |
| 2003/0009648 A1* | 1/2003 | Doing et al. ................. | 711/202 |
| 2004/0205203 A1 | 10/2004 | Peinado et al. | |
| 2005/0071601 A1* | 3/2005 | Luick ............................ | 711/206 |
| 2005/0097298 A1 | 5/2005 | Cohen | |
| 2005/0182912 A1* | 8/2005 | DeMent et al. ............... | 711/206 |
| 2006/0004944 A1 | 1/2006 | Vij et al. | |
| 2006/0174053 A1 | 8/2006 | Anderson et al. | |
| 2006/0206658 A1 | 9/2006 | Hendel et al. | |

(Continued)

FOREIGN PATENT DOCUMENTS

EP    0 303 783 A2    2/1989

(Continued)

OTHER PUBLICATIONS

U.S. Appl. No. 12/272,243, filed Nov. 17, 2008, Hall, William E., et al.

(Continued)

*Primary Examiner* — Jared Rutz
*Assistant Examiner* — Ryan Bertram
(74) *Attorney, Agent, or Firm* — Stephen J. Walder, Jr.; Preston J. Young (57) ABSTRACT

A mechanism is provided, in a data processing system, for accessing memory based on an effective address submitted by a process of a partition. The mechanism may translate the effective address into a virtual address using a segment lookaside buffer. The mechanism may further translate the virtual address into a partition real address using a page table. Moreover, the mechanism may translate the partition real address into a system real address using a logical partition real memory map for the partition. The system real address may then be used to access the memory.

20 Claims, 6 Drawing Sheets

U.S. PATENT DOCUMENTS

| | | | |
|---|---|---|---|
| 2006/0206687 A1 | 9/2006 | Vega | |
| 2006/0259732 A1 | 11/2006 | Traut et al. | |
| 2006/0259734 A1 | 11/2006 | Sheu et al. | |
| 2006/0259818 A1 | 11/2006 | Howell et al. | |
| 2007/0008324 A1 | 1/2007 | Green | |
| 2007/0016755 A1 | 1/2007 | Pratt | |
| 2008/0168254 A1* | 7/2008 | Corrigan et al. | 711/207 |
| 2009/0113164 A1* | 4/2009 | Rajamony et al. | 711/202 |
| 2009/0198953 A1* | 8/2009 | Arimilli et al. | 711/208 |
| 2010/0125708 A1 | 5/2010 | Hall et al. | |

FOREIGN PATENT DOCUMENTS

| | | |
|---|---|---|
| EP | 0 303 783 B1 | 4/1994 |
| EP | 1 528 474 A2 | 5/2005 |
| EP | 1 701 268 A2 | 9/2006 |

OTHER PUBLICATIONS

"IBM Virtual Machine Facility/370: Data Areas and Control Block Logic, Release 3, PLC1", IBM Corporation, File No. S370-36, Order No. SY20-0884-0, Feb. 1976, 317 pages.

"IBM Virtual Machine Facility/370: System Logic and Problem Determination Guide vol. 1", IBM Corporation, File No. S370-36, Order No. SY20-0886-1, Mar. 1979, 455 pages (7 pages submitted herewith).

"Power ISA™ Version 2.05", Book III-S: Power ISA Operating Environment Architecture—Server Environment, Sections 5.7.5 through 5.7.7.3, IBM Corporation, Oct. 23, 2007, http://www.power.org/resources/reading/PowerISA_V2.05.pdf, 12 pages.

"Power.org™ Standard for Power Architecture™ Platform Requirements (Workstation, Server)", Version 2.0, Section 14.5.4.1, Power.org, Aug. 28, 2006, http://www.power.org/members/developers/specs/PAPR_Version_2.0_28August06.pdf, 96 pages.

Barham, Paul et al., "Xen and the Art of Virtualization", Proceedings of the Nineteenth ACM Symposium on Operating Systems Principles (SOSP), Oct. 19-22, 2003, http://www.cl.cam.ac.uk/Research/SRG/netos/papers/2003-xensosp.pdf, 14 pages.

Goldberg, Robert P., "Architectural Principles for Virtual Computer Systems", Ph.D. Thesis in Division of Engineering and Applied Physics, Feb. 1973, Harvard University: Cambridge, MA. Published as ESD-TR-73-105. HQ Electronics Systems Division, Hanscom AFB, MA, 249 pages.

USPTO U.S. Appl. No. 12/272,243, 1 page.

Office Action mailed Dec. 27, 2011 for U.S. Appl. No. 12/272,243; 18 pages.

* cited by examiner

| FIG. 5A |
| FIG. 5B |

LOGICAL PARTITION MEMORY

BACKGROUND

The present application relates generally to an improved data processing apparatus and method and more specifically to a logical partition memory.

Contemporary technology enables economical fabrication of computer systems with generous complements of resources, including multiple processors, large primary fast memory, very large secondary storage, and many I/O devices. The concepts of virtualization and logical partitioning have been developed to efficiently use these systems for workloads of widely varying capacity and schedule demands. The total system resources are divided among a number of logical partitions, sometimes called virtual machines because each can operate autonomously as if it were a separate hardware system of smaller capacity. The number of partitions and the amount of resources assigned to each may vary widely and be changed dynamically, to match needs of different, independent workloads and to accommodate their time-varying demands. Usually, processors may be dynamically switched between partitions at millisecond intervals while primary memory and secondary storage may require longer intervals for reallocation between partitions, still quite adequate to respond to daily and time-zone scheduling variations. Each partition usually runs a full software stack, such as operating system, middleware, and related applications, that would run on an independent system.

The system component that manages logical partitioning is a combination of hardware and software called the hypervisor. It creates logical partitions, assigns resources to them, enforces resource separation and authorized sharing between them, and dynamically alters resource assignments to them, in response to demands of the independent partition workloads and overall system performance goals. This core resource allocation function is necessarily the most privileged function in the overall system and is therefore part of the Reference Monitor component in systems that implement the Multi-Level Security models established by government and industry standards.

The historical approach to separation of real memory into partitions is called full virtualization of address translation and partition memory. The hypervisor is given exclusive control of the virtual address translation features of the system hardware, by running all partition software, including the Operating System (OS), in a non-privileged state. Each partition OS is given an allocation of real memory, which it may treat as a single block of apparent real addresses beginning at zero. The hypervisor keeps a real memory map that records which blocks of real memory are actually allocated to each partition. The partition OS controls the assignment of real memory pages to virtual addresses and stores these assignments in its page table, just as it would do if running on its own real hardware instead of in a logical partition (virtual machine) provided by the hypervisor. However, the OS cannot install its page table for the hardware to use because the privileged operation to do this causes interrupts to the hypervisor.

When this occurs, the hypervisor remembers the address of the OS's page table and instead installs a hypervisor page table for the hardware. When a page fault occurs, the hypervisor receives the interrupt and looks in the OS's page table for a translation of the faulting virtual address. If one is found, the hypervisor uses its real memory map to translate the apparent real address from the OS's page table to an actual real address in a block of real memory allocated to the partition, stores this virtual-to-real translation in the hypervisor page table used by the hardware, and resumes the page-faulting operation. If no translation is found in the OS's page table, a page fault interrupt is passed to the OS. After the OS assigns a real page to the virtual address in its page table, the above process is repeated to resolve the fault. If the OS needs to disable virtual address translation and directly address its apparent real memory, for example in some architectures to receive an interrupt, the hypervisor prevents this but instead installs another page table that translates partition apparent real addresses directly to actual real addresses allocated to the partition, thereby simulating real addressing mode.

Paravirtualization is an alternative to full virtualization that was developed to avoid some of the latter's overhead costs due to, for example, simulation of privileged operations and real addressing mode, passing interrupts, maintaining multiple page tables, and sometimes needing multiple page faults to resolve one virtual translation. With paravirtualization, the OS runs in a mostly-privileged state and receives page fault interrupts directly from the hardware. A hardware register is provided to hold the actual real address of the one real memory block allocated to the partition for apparent real address zero. This is used when virtual address translation is disabled because the OS receives an interrupt, to avoid simulation of real addressing mode.

The hypervisor runs in the most-privileged state and retains exclusive control of the page table used by the hardware, as with full virtualization. To resolve a page fault, the partition OS assigns an apparent real page to the faulting virtual address, just as it would for full virtualization or when running on its own real hardware. However, instead of storing this translation in its own page table, which the hardware can't use, it calls the hypervisor, passing the virtual-to-real translation as a parameter. The hypervisor, using its real memory map, translates the apparent real address to an actual real address and stores the virtual-to-real translation in the hypervisor page table used by the hardware, as with full virtualization. This avoids multiple tables and faults.

Although paravirtualization offers better performance than full virtualization, it requires significant OS changes and calls to the hypervisor to resolve page faults. In addition, the security of real memory separation of partitions depends on the correctness of the hypervisor in allocating real memory to partitions. The security of real memory separation of partitions further depends on the hypervisor correctly translating partition apparent real addresses to actual real addresses and correctly maintaining the resulting virtual-to-real translations in the hypervisor page tables used by the hardware. Moreover, for full virtualization, the security of real memory separation of partitions depends on the hypervisor correctly interpreting the OS's page tables.

SUMMARY

In one illustrative embodiment, a method, in a data processing system, is provided for accessing memory based on an effective address submitted by a process of a partition. The method may comprises receiving the effective address from the process of the currently active logical partition and translating the effective address into a virtual address using a segment look-aside buffer. The method may further comprise translating the virtual address into a partition real address using a page table. Moreover, the method may comprise translating the partition real address into a system real address using a logical partition real memory map for the partition. The system real address may be used to access the memory.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of, the operations outlined above with regard to the method illustrative embodiment.

These and other features and advantages of the present invention will be described in, or will become apparent to those of ordinary skill in the art in view of, the following detailed description of the exemplary embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide a mechanism for the hypervisor's assignment of primary fast real memory to logical partitions, including enforcement of real memory separation between partitions while allowing authorized sharing of memory. Moreover, the illustrative embodiments provide an architecture for the hypervisor real memory map that is used directly by the hardware and that avoids the OS changes and calls to the hypervisor of paravirtualization. The architecture further reduces the size of the hypervisor core function whose correctness determines the security of real memory separation of partitions.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, radio frequency (RF), etc.

Computer program code for carrying out operations of the present invention may be written in any combination of one or more programming languages, including an object oriented programming language such as Java™, Smalltalk™, C++ or the like and conventional procedural programming languages, such as the "C" programming language or similar programming languages, or even or lower level languages such as assembler or microcode. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The illustrative embodiments are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 1:
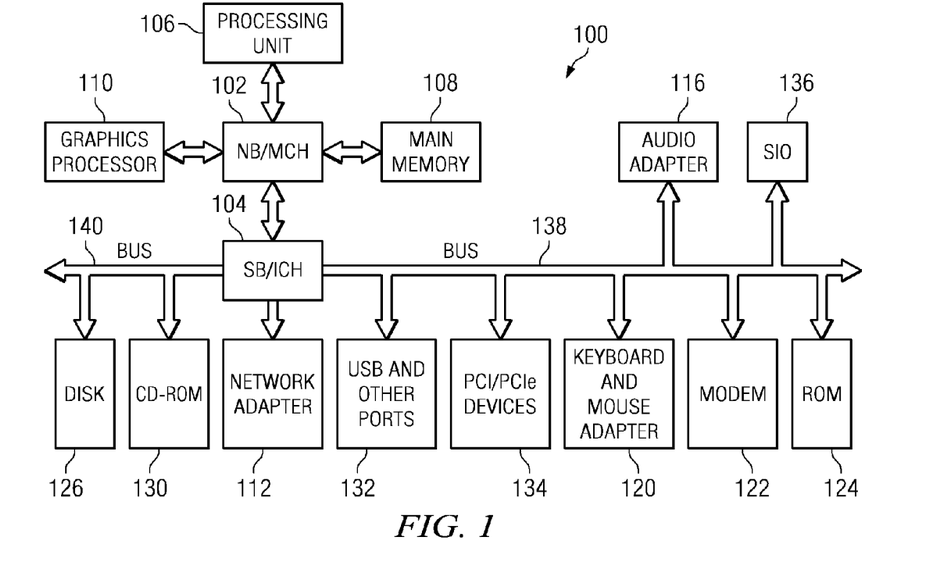
FIG. 1 is an exemplary diagram of a data processing system in which exemplary aspects of the illustrative embodiments may be implemented.

The illustrative embodiments may be utilized in many different types of data processing environments including a distributed data processing environment, a single data processing device, or the like. In order to provide a context for the description of the specific elements and functionality of the illustrative embodiments, FIG. 1 is provided hereafter as an exemplary data processing environment in which exemplary aspects of the illustrative embodiments may be implemented. It should be appreciated that FIG. 1 is only exemplary and is not intended to assert or imply any limitation with regard to the data processing environments in which aspects of the illustrative embodiments may be implemented. Many modifications to the depicted data processing environment may be made without departing from the spirit and scope of the present invention.

With reference now to the figures, FIG. 1 is a block diagram of an exemplary data processing system in which aspects of the illustrative embodiments may be implemented. Data processing system 100 is an example of a computer in which computer usable code or instructions implementing the processes for illustrative embodiments of the present invention may be located.

In the depicted example, data processing system 100 employs a hub architecture including north bridge and memory controller hub (NB/MCH) 102 and south bridge and input/output (I/O) controller hub (SB/ICH) 104. Processing unit 106, main memory 108, and graphics processor 110 are connected to NB/MCH 102. Graphics processor 110 may be connected to NB/MCH 102 through an accelerated graphics port (AGP).

In the depicted example, local area network (LAN) adapter 112 connects to SB/ICH 104. Audio adapter 116, keyboard and mouse adapter 120, modem 122, read only memory (ROM) 124, hard disk drive (HDD) 126, CD-ROM drive 130, universal serial bus (USB) ports and other communication ports 132, and PCI/PCIe devices 134 connect to SB/ICH 204 through bus 138 and bus 140. PCI/PCIe devices may include, for example, Ethernet adapters, add-in cards, and PC cards for notebook computers. PCI uses a card bus controller, while PCIe does not. ROM 124 may be, for example, a flash basic input/output system (BIOS).

HDD 126 and CD-ROM drive 130 connect to SB/ICH 104 through bus 140. HDD 126 and CD-ROM drive 130 may use, for example, an integrated drive electronics (IDE) or serial advanced technology attachment (SATA) interface. Super I/O (SIO) device 136 may be connected to SB/ICH 104.

An operating system runs on processing unit 106. The operating system coordinates and provides control of various components within the data processing system 100 in FIG. 1. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 100 (Java is a trademark of Sun Microsystems, Inc. in the United States, other countries, or both).

As a server, data processing system 100 may be, for example, an IBM® eServer™ System p® computer system, running the Advanced Interactive Executive (AIX®) operating system or the LINUX® operating system (eServer, System p, and AIX are trademarks of International Business Machines Corporation in the United States, other countries, or both while LINUX is a trademark of Linus Torvalds in the United States, other countries, or both). Data processing system 100 may be a symmetric multiprocessor (SMP) system including a plurality of processors in processing unit 106. Alternatively, a single processor system may be employed.

Instructions for the operating system, the object-oriented programming system, and applications or programs are located on storage devices, such as HDD 126, and may be loaded into main memory 108 for execution by processing unit 106. The processes for illustrative embodiments of the present invention may be performed by processing unit 106 using computer usable program code, which may be located in a memory such as, for example, main memory 108, ROM 124, or in one or more peripheral devices 126 and 130, for example.

A bus system, such as bus 138 or bus 140 as shown in FIG. 1, may be comprised of one or more buses. Of course, the bus system may be implemented using any type of communication fabric or architecture that provides for a transfer of data between different components or devices attached to the fabric or architecture. A communication unit, such as modem 122 or network adapter 112 of FIG. 1, may include one or more devices used to transmit and receive data. A memory may be, for example, main memory 108, ROM 124, or a cache such as found in NB/MCH 102 in FIG. 1.

Those of ordinary skill in the art will appreciate that the hardware in FIG. 1 may vary depending on the implementation. Other internal hardware or peripheral devices, such as flash memory, equivalent non-volatile memory, or optical disk drives and the like, may be used in addition to or in place of the hardware depicted in FIG. 1. Also, the processes of the illustrative embodiments may be applied to a multiprocessor data processing system, other than the SMP system mentioned previously, without departing from the spirit and scope of the present invention.

Moreover, the data processing system 100 may take the form of any of a number of different data processing systems including client computing devices, server computing devices, a tablet computer, laptop computer, telephone or other communication device, a personal digital assistant (PDA), or the like. In some illustrative examples, data processing system 100 may be a portable computing device which is configured with flash memory to provide non-volatile memory for storing operating system files and/or user-generated data, for example. Essentially, data processing system 100 may be any known or later developed data processing system without architectural limitation.

Figure 2:
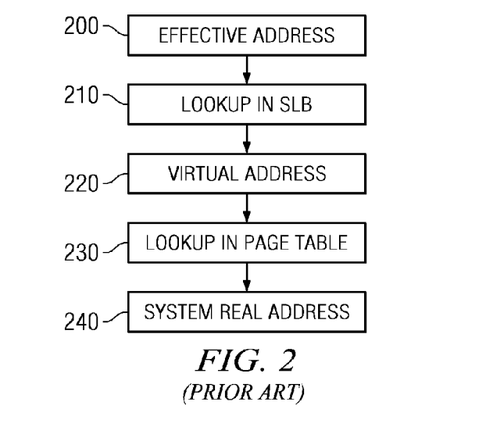
FIG. 2 is an exemplary diagram illustrating a known method of address translation.

FIG. 2 is an overview of address translation as it exists in the art today. As shown in FIG. 2, the effective address (EA) 200 is the address generated by a processor for an instruction fetch or for a data access. If address translation is enabled, this address is passed to an address translation mechanism which converts the effective address to a real address. The real address is then used to access memory. With regard to FIG. 2, this translation operation is shown in terms of the Power PC architecture available from International Business Machines Corporation of Armonk, N.Y. It should be appreciated that while a Power PC architecture is used for exemplary purposes, the depicted address translation mechanism may be applied to any architecture.

As shown in FIG. 2, the first step is to take the EA 200 and generate a virtual address (VA) 220 by performing a lookup operation in a segment look-aside buffer (SLB) 210. The next step is to generate a real address (RA) 240 by performing a lookup operation of the virtual address 220 in the page tables 230. The real address 240 is then used to access memory. It is well known that there can be faults in this process that have to be corrected by a combination of hardware and software.

Figure 3:
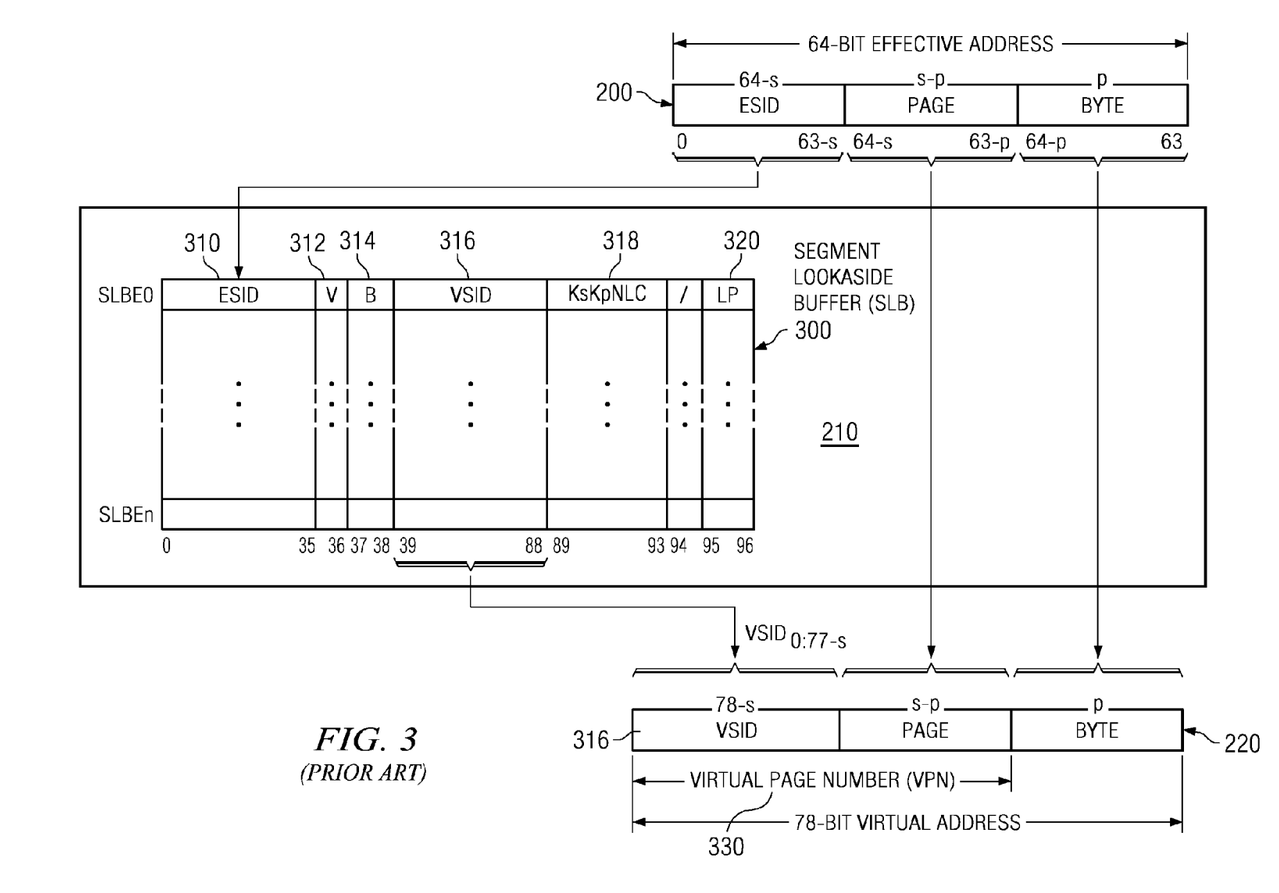
FIGS. 3 and 4 provide an exemplary diagram illustrating a known translation method for translating an effective address into a real address.
Figure 4:
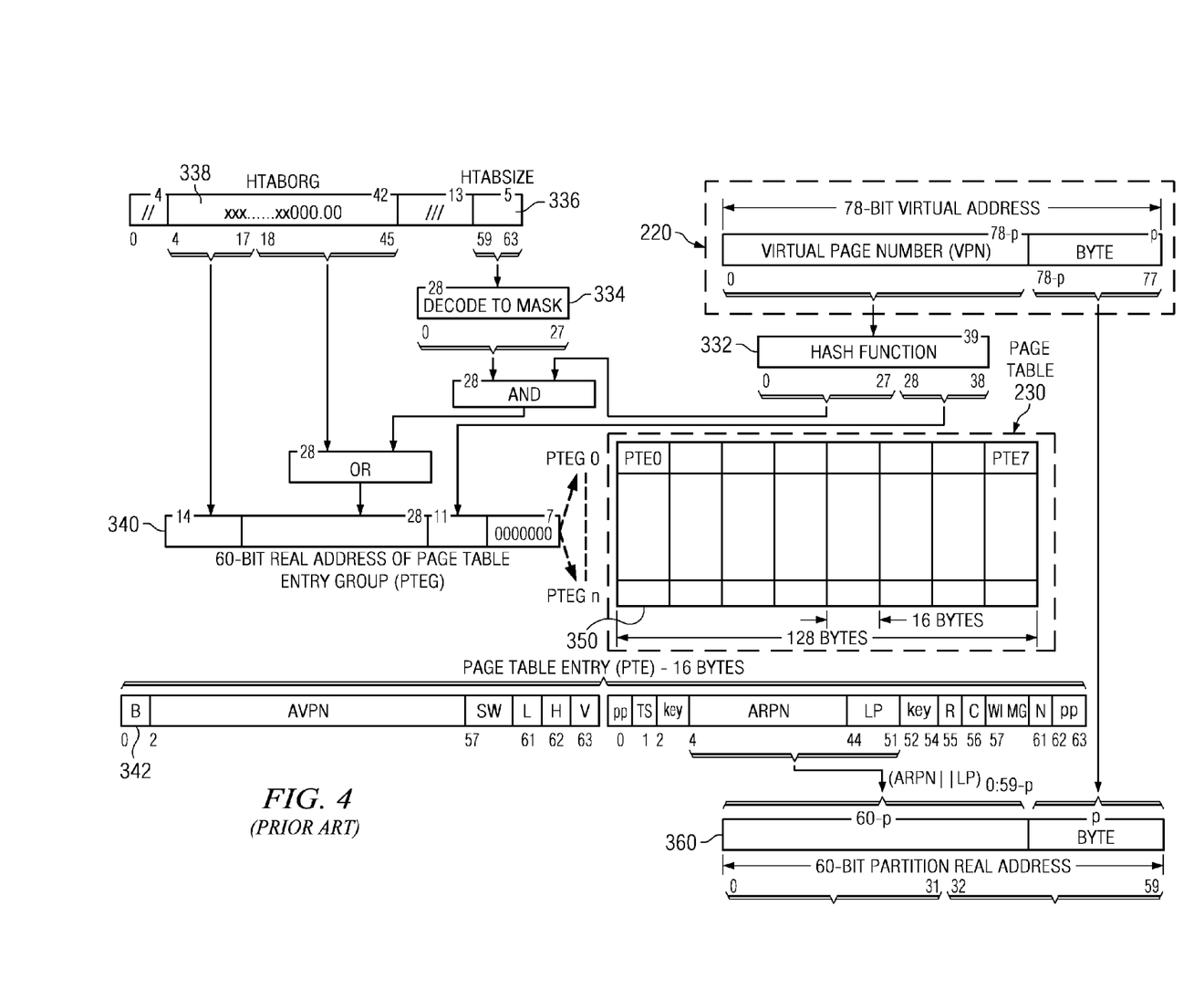

FIGS. 3-4 provide another illustration of an address translation as it exists in the art today. As shown in FIG. 3, the first step is to take an effective address 200 and look it up in the segment look-aside buffer (SLB) 210 which produces a virtual address 220. The SLB 210 specifies the mapping between effective segment identifiers (ESIDs) and virtual segment identifiers (VSIDs). Each SLB entry maps one ESID to one VSID. As shown in FIG. 3, the SLB entry 300 includes an ESID 310, a valid bit 312, a segment size selector 314, a virtual segment identifier (VSID) 316, an entry portion 318 having a supervisor state storage key (Ks), a problem state storage key (Kp), a no-execute segment (N), a virtual page size selector bit 0 (L), and a class (C), and a virtual page size selector bits 1:2 (LP) 320.

As shown in FIG. 3, the effective address 200 includes an ESID which is translated by the SLB entry 300 into a corresponding VSID 316 which is output by the SLB 210 as part of the virtual address 220. The page identifier and byte identifier from the effective address 200 are output as part of the virtual address 220. The VSID 316 and page identifier together form a virtual page number (VPN) 330 which, as shown in FIG. 4, is then input to a hash function 332 in order to generate a hash value. The first 28 bits of the hash value output by the hash function 332 are AND'd with a "decode to mask" value 334 generated based on the page table size (HTABSIZE) 336 obtained from a storage description register. The output of the AND function is OR'd with a real address of the page table (HTABORG) 338 obtained from the storage description register. A combination of the real address of the page table, the result of the OR operation, and bits 28 to 38 of the hash value generated by the hash function 332 is output as the real address of the page table entry group (PTEG) 340.

The real address of the PTEG 340 selects a PTEG from the page table 350 containing 8 page table entries (PTEs). One PTE 342 is selected if its abbreviated virtual page number (AVPN) field matches the upper 55 bits of the VPN field of the virtual address 220. The abbreviated real page number (ARPN) and large page (LP) fields of this PTE 342 are then concatenated with the byte address from the virtual address 220 to generate a system real address 360. This system real address 360 is then used to access a corresponding portion of memory. For more details of this known translation mechanism, reference is made to the Power Instruction Set Architecture (ISA) available from www.power.org.

The mechanisms of address translation shown in FIGS. 3-4 can be used to achieve an environment of virtual machines with multiple logical partitions, using the techniques of full virtualization or paravirtualization as previously described. However, these approaches have significant drawbacks that may reduce system performance and/or increase the difficulty of maintaining system correctness and security. With full virtualization, the hypervisor must simulate privileged operations, correctly interpret the operating system's page tables, maintain multiple hypervisor page tables, reflect some interrupts it receives to the operating system, and sometimes cause multiple interrupts for a single page fault. With paravirtualization, the operating system must be significantly modified and often two versions of the operating system must be maintained in parallel, so that it can be used either (1) directly on a machine or fully-virtualized virtual machine, or (2) in a virtual machine provided by a hypervisor that uses paravirtualization. With both approaches, the security of real memory separation of partitions depends on the hypervisor correctly translating partition apparent real addresses to actual system real addresses and correctly maintaining the resulting virtual-to-real translations in the hypervisor page tables used by the hardware.

In the illustrative embodiments of the present invention, the mechanisms described above with regard to FIGS. 3-4 are unchanged except for the software program allowed to use the mechanisms and the naming of the result. However, with the illustrative embodiments of the present invention, another address translation mechanism, specifically configured for the usual practice of modern hypervisors in allocating real memory to logical partitions, is added to the hardware to replace most of the actions required of hypervisor software in address translation and partition real memory separation. This additional mechanism removes the drawbacks listed above that occur when existing art is used for full virtualization or paravirtualization, with resulting improvement in system performance, correctness, and security. The operating system (OS) does not need to be modified from that which runs directly on a real machine. The tables constructed by the OS, described above with regard to FIGS. 3-4, may now be used directly by the hardware for translation using the mechanisms of the illustrative embodiments.

The hypervisor does not have control of the page table and no interrupt occurs when the OS loads the HTABORG 338 and HTABSIZE 336 fields of the storage description register to identify this table, as required by the described existing art for virtual machines. The hypervisor does not simulate OS privileged operations, interpret OS page tables, maintain hypervisor page tables, reflect interrupts to the OS, or translate partition apparent real addresses to actual system real addresses. Instead, the hypervisor only needs to perform its irreducible function of allocating real memory to the several logical partitions, usually in very large blocks, and store the system real addresses and sizes of the allocated blocks in a new table added by the illustrative embodiments, referred to as the logical partition real memory map. Once these hypervisor allocations are stored in the logical partition real memory map, which occurs mostly when the partition is first setup and is a low-frequency event, the translation from virtual address to system real address takes place entirely within hardware and not in the hypervisor software. If a page fault occurs, the interrupt goes directly to the OS and the OS resolves the fault by modifying its page table, to be used directly by the hardware.

The result of translation by the page table is renamed to be the partition real address instead of system real address. This partition real address is further translated into a system real address by the hardware, using the logical partition real memory map, as will be described. Since this new mechanism controls all system real addresses used to address memory, and since it is accessible only to the hypervisor, the guest OS's in different logical partitions are unaware of its existence and cannot violate the separation of real memory allocation to partitions determined by the hypervisor, even though they can store any partition real addresses in their page tables.

Figures 5, 5A:
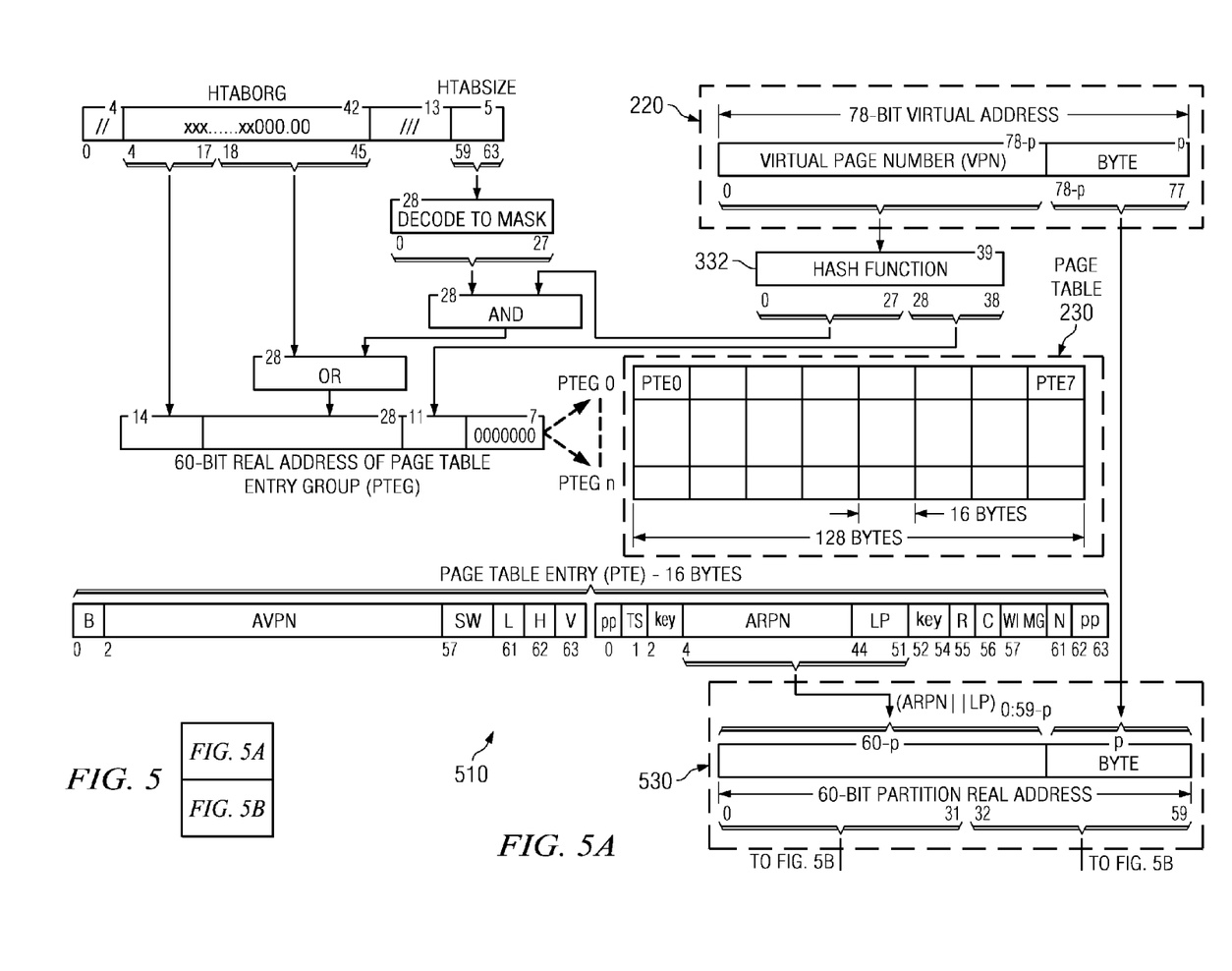
FIGS. 5, 5a, and 5b are an exemplary diagram outlining a translation method in accordance with one illustrative embodiment.
Figure 5B:
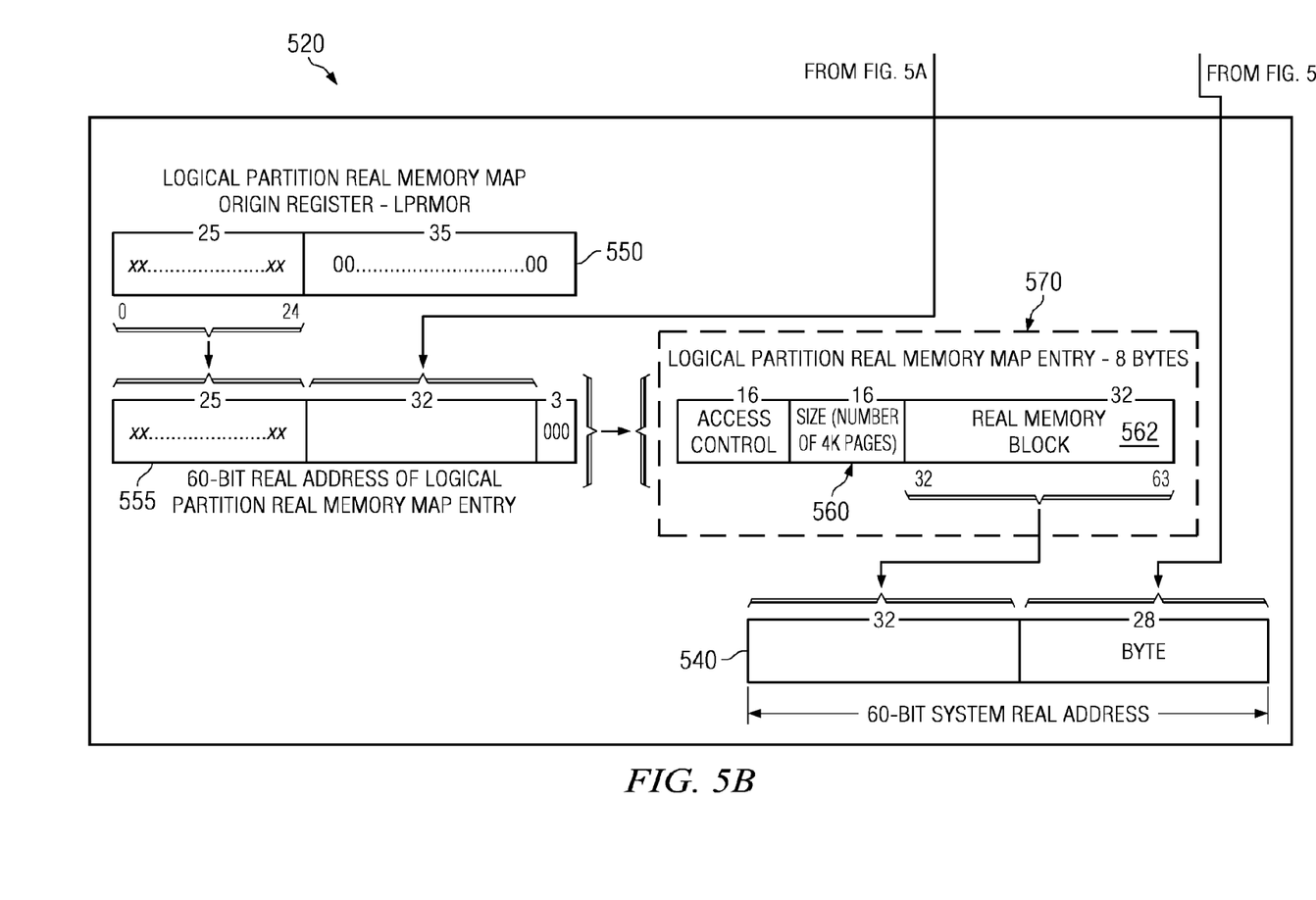

FIG. 5 is an exemplary diagram outlining a translation method in accordance with one illustrative embodiment of the present invention. The method shown in FIG. 5 is shown in association with the hardware elements, of one illustrative embodiment, used to implement the method, e.g., the registers, logic units, and the like. For example, with one illustrative embodiment, arrowed lines in FIG. 5 represent hardware implemented signal lines which are used to transmit bit values between the elements depicted. Unless otherwise indicated, elements depicted as storing bit values are registers or other storage devices implemented in hardware of a processor of a data processing system. It should be noted, however, as discussed previously, that in some illustrative embodiments the various operations of the methods may be implemented as computer instructions executed by a processor. For purposes of the depicted example, however, it will be assumed that the operations are implemented in hardware.

As shown in FIG. 5, the first portion of the diagram 510 corresponds to the operation outlined with regard to FIGS. 3-4. The main exception is that the resulting address generated by this operation is a partition real address 530, rather than a system real address, since the partition real address 530 represents a "real address" from the view point of the logical partition but does not represent the actual real address for accessing memory.

As shown in FIG. 5, in a second portion of the diagram 520, a logical partition real memory map is used along with the partition real address 530 to obtain the system real address 540 that is ultimately used to access real memory allocated to the partition. As shown in FIG. 5, the data processing system in which the elements of FIG. 5 are implemented may support a plurality of different logical partition real memory maps, one for each logical partition currently present in the data processing system. An address value for the particular logical partition real memory map for the currently active logical partition is loaded into the logical partition real memory map origin register (LPRMOR) 550 by the hypervisor when there is a switch to that particular logical partition by the processor hardware. Thus, the LPRMOR 550 may have different values depending upon which logical partition is currently attempting to access memory, i.e. the currently active logical partition.

The address value in the LPRMOR 550 is used with the partition real address 530 to generate a real address 555 of a logical partition real memory map entry 560 in the logical partition real memory map 570. In particular, the partition real address 530 is divided into two parts. The high order part, which in the depicted example is bits 0-31 of the partition real address 530, is the index into the logical partition real memory map 570. The low order part, which in the depicted example is bits 32-59 of the partition real address 530, becomes the low order bits of the system real address. While particular bits are shown as being part of the high order bits and low order bits in accordance with the PowerPC architecture, it should be appreciated that this is only exemplary. The key concept here is that the partition real address 530 is divided into low and high order parts in a manner that is consistent with the address translation of the particular architecture in which the illustrative embodiments are implemented.

As further shown in FIG. 5, the first 25 bits of the address value in the LPRMOR 550, which points to the base address of the logical partition real memory map table 570, is combined with the high order bits of the partition real address 530, followed by three zero bits to complete a 60 bit address, to generate a real address 555 of a logical partition real memory map entry 560. The entry 560 includes a real memory block field 562 which is combined with the low-order 28 bits of the partition real address 530 to generate a system real address 540. The system real address 540 is output for use in accessing real memory.

In the depicted illustrative embodiment, each logical partition real memory map entry 560 in the logical partition real memory map table 570 contains two bytes of access control, which is defined in a way that is consistent with access control in the architecture where the illustrative embodiment is implemented. Each logical partition real memory map entry 560 also contains a two-byte size field that defines the size of the real memory block allocated to the partition and addressed by the real memory block field 562. As depicted, the value in the size field is the number of 4K pages in the real memory block. This acts as a limit on the maximum value of the 28-bit byte address field that comes from the partition real address 530 and goes into the system real address 540. If the upper 16-bits of the 28-bit byte address field of the system real address 540 are greater than the size field of the logical partition real memory map entry 560 used for the translation, then the memory access is not allowed by the hardware. As an alternative, the size may be a fixed set where each member is represented by a specific value in this field. Any method known in the art can be used to encode the size field in the logical partition real memory map entry 560 without departing from the spirit and scope of the illustrative embodiments.

Those of ordinary skill in the art realize that the size of the table entries and the partitioning of the addresses must be done in a manner that is consistent with the architecture where the illustrative embodiments are implemented. Further the size of the logical partition real memory map entry may vary depending upon the particular architecture in which the illustrative embodiments are implemented. However, it should be appreciated that the number of bits used to generate the address of the entry should be maintained consistent with the size of each entry.

Figure 6:
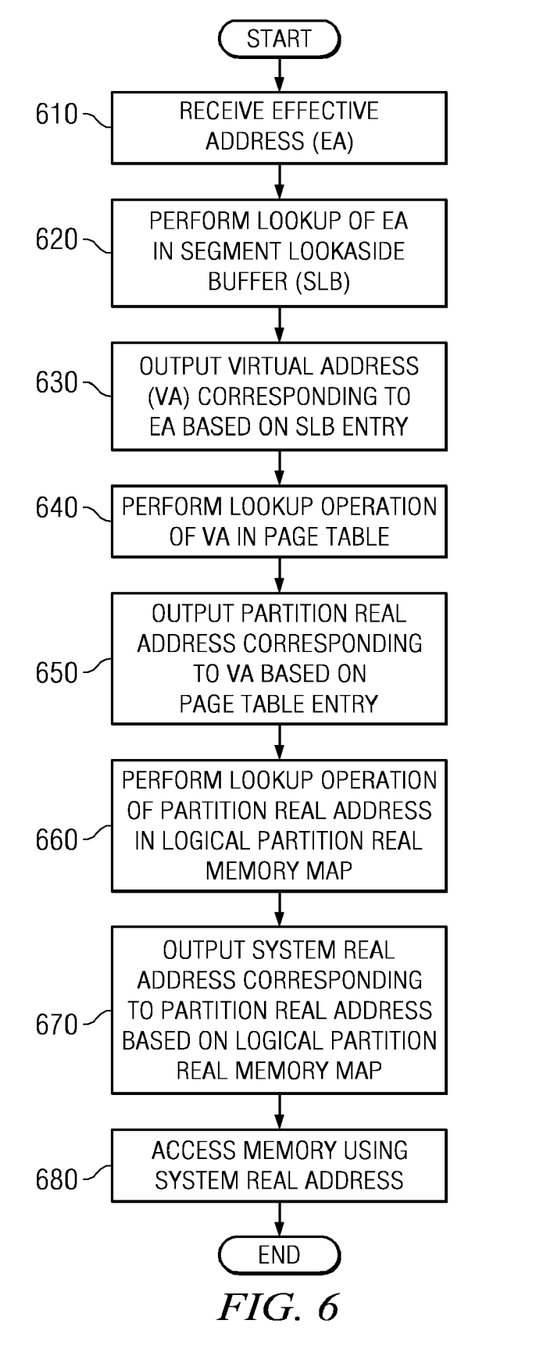
FIG. 6 is a flowchart outlining a translation operation in accordance with the mechanisms of one illustrative embodiment.

FIG. 6 is a flowchart outlining a translation operation in accordance with the mechanisms of one illustrative embodiment. As shown in FIG. 6, the translation operation starts with receiving an effective address that is to be translated (step 610). The effective address is used to perform a lookup operation in a segment lookaside buffer (SLB) (step 620) to generate a virtual address corresponding to the effective address (step 630). The virtual address is used to perform a lookup operation in a page table (step 640) to generate a partition real address corresponding to the virtual address (step 650). The partition real address is used to perform a lookup operation in a logical partition real memory map (step 660) to generate a system real address corresponding to the partition real address (step 670). The system real address is then used to access a portion of memory allocated to the partition (step 680). The operation then terminates.

Thus, the illustrative embodiments provide mechanisms for accessing memory based on an effective address submitted by a process of a partition. The illustrative embodiments provide an additional address translation mechanism in hardware, specifically configured for the usual practice of modern hypervisors in allocating real memory to logical partitions, to replace most of the actions required of hypervisor software in address translation and partition real memory separation. The additional address translation mechanism removes the drawbacks that occur when existing art is used for full virtualization or paravirtualization, with resulting improvement in system performance, correctness, and security. Moreover, with the benefits of the illustrative embodiments, the operating system does not need to be modified from that which runs directly on a real machine.

As noted above, it should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for accessing memory based on an effective address submitted by a process of a currently active logical partition, comprising:
   receiving the effective address from the process of the currently active logical partition;
   translating the effective address into a virtual address using a segment look-aside buffer;
   translating the virtual address into a partition real address using a page table;
   translating the partition real address into a system real address using a current logical partition real memory map for the currently active logical partition; and
   accessing the memory using the system real address.

2. The method of claim wherein the data processing system supports a plurality of logical partition real memory maps, and wherein the method further comprises:
   loading an address value of the current logical partition real memory map for the currently active logical partition into a logical partition real memory map origin register (LPRMOR) in response to a switch to the currently active logical partition by processor hardware of the data processing system.

3. The method of claim 2, wherein translating the partition real address into a system real address further comprises:
   generating a real address of a logical partition real memory map entry in the current logical partition real memory map based on the address value of the current logical partition real memory map in the LPRMOR and the partition real address; and
   accessing the logical partition real memory map based on the real address of the logical partition real memory map entry.

4. The method of claim 3, wherein the address value of the current logical partition real memory map comprises a plurality of subsets of bits and the partition real address has a plurality of subsets of bits, and wherein generating a real address of the logical partition real memory map entry in the current logical partition real memory map comprises combining a first subset of bits from the partition real address with a second subset of bits from the address value of the current logical partition real memory map.

5. The method of claim 4, wherein the first subset of bits comprises high order bits of the partition real address and the second subset of bits comprises bits pointing to a base address of the current logical partition real memory map.

6. The method of claim 3, wherein the logical partition real memory map entry comprises a real memory block field which is combined with low order bits of the partition real address to generate the system real address.

7. The method of claim 6, wherein the low order bits of the partition real address are low order bits of the system real address and bits in the real memory block field are high order bits of the system real address.

8. The method of claim 6, wherein the logical partition real memory map entry comprises a two-byte size field that defines a size of the real memory block allocated to the currently active logical partition and addressed by the real memory block field.

9. The method of claim 8, wherein the size of the real memory block is a limit on a maximum value of an address field that comes from the partition real address and is used to generate the system real address.

10. The method of claim 9, wherein if a value of an upper set of bits of the address field of the partition real address are greater than the size field of the logical partition real memory map entry, then the memory access is not allowed by the processor hardware.

11. An apparatus, comprising:
   a processor; and
   a memory coupled to the processor, wherein the processor operates to:
   receive an effective address from a process of a currently active logical partition, translate the effective address into a virtual address using a segment look-aside buffer, translate the virtual address into a partition real address using a page table, translate the partition real address into a system real address using a logical partition real memory map for the partition, and access the memory using the system real address.

12. The apparatus of claim 11, wherein the apparatus further comprises a hypervisor, wherein the apparatus supports a plurality of logical partition real memory maps, and wherein the hypervisor loads an address value of the current logical partition real memory map for the currently active logical partition into a logical partition real memory map origin register (LPRMOR) in response to a switch to the currently active logical partition by the processor.

13. The apparatus of claim 12, wherein the processor translates the partition real address into a system real address by:

generating a real address of a logical partition real memory map entry in the current logical partition real memory map based on the address value of the current logical partition real memory map in the LPRMOR and the partition real address; and accessing the logical partition real memory map based on the real address of the logical partition real memory map entry.

14. The apparatus of claim 13, wherein the address value of the current logical partition real memory map comprises a plurality of subsets of bits and the partition real address has a plurality of subsets of bits, and wherein generating a real address of the logical partition real memory map entry in the current logical partition real memory map comprises combining a first subset of bits from the partition real address with a second subset of bits from the address value of the current logical partition real memory map.

15. The apparatus of claim 14, wherein the first subset of bits comprises high order bits of the partition real address and the second subset of bits comprises bits pointing to a base address of the current logical partition real memory map.

16. The apparatus of claim 13, wherein the logical partition real memory map entry comprises a real memory block field which is combined with low order bits of the partition real address to generate the system real address.

17. The apparatus of claim 16, wherein the logical partition real memory map entry comprises a two-byte size field that defines a size of the real memory block allocated to the currently active logical partition and addressed by the real memory block field.

18. The apparatus of claim 17, wherein the size attic real memory block is a limit on a maximum value of an address field that comes from the partition real address and is used to generate the system real address.

19. The apparatus of claim 18, wherein if a value of an upper set of bits of the address field of the partition real address are greater than the size field of the logical partition real memory map entry, then accessing the memory is not allowed by the processor.

20. A computer program product comprising a non-transitory computer recordable medium having a computer readable program recorded thereon, wherein the computer readable program, when executed on a computing device, causes the computing device to:

receive an effective address from a process of a currently active logical partition:

translate the effective address into a virtual address using a segment look-aside buffer:

translate virtual address into a partition real address using a page table;

translate the partition real address into a system real address using a logical partition real memory map for the partition: and access the memory using the system real address.

* * * * *